(12) United States Patent
Uesugi et al.

(10) Patent No.: US 7,215,642 B2
(45) Date of Patent: May 8, 2007

(54) SYSTEM AND METHOD FOR REGULATING DATA TRANSMISSION IN ACCORDANCE WITH A RECEIVER'S EXPECTED DEMODULATION CAPACITY

(75) Inventors: Mitsuru Uesugi, Yokosuka (JP); Katsuhiko Hiramatsu, Yokosuka (JP); Kazuyuki Miya, Kawasaki (JP); Osamu Kato, Yokosuka (JP); Junichi Aizawa, Yokohama (JP); Toyoki Ue, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 842 days.

(21) Appl. No.: 10/030,992

(22) PCT Filed: May 18, 2001

(86) PCT No.: PCT/JP01/04154

§ 371 (c)(1),
(2), (4) Date: Jan. 16, 2002

(87) PCT Pub. No.: WO01/91358

PCT Pub. Date: Nov. 29, 2001

(65) Prior Publication Data

US 2003/0072266 A1 Apr. 17, 2003

(30) Foreign Application Priority Data

May 22, 2000 (JP) .............................. 2000-150507
Mar. 19, 2001 (JP) .............................. 2001-078466

(51) Int. Cl.
*G06F 11/00* (2006.01)

(52) U.S. Cl. ...................... 370/236; 370/252; 370/329; 455/452.2

(58) Field of Classification Search ................ 370/236, 370/282, 278, 341; 455/452.1, 452.2
See application file for complete search history.

(56) References Cited

U.S. PATENT DOCUMENTS 6,262,994 B1 * 7/2001 Dirschedl et al. ........... 370/465

(Continued)

FOREIGN PATENT DOCUMENTS

EP 0831615 A2 3/1998

(Continued)

OTHER PUBLICATIONS

Supplementary European Search Report dated Aug. 10, 2004.

(Continued)

*Primary Examiner*—Hassan Kizou
*Assistant Examiner*—Brian Roberts
(74) *Attorney, Agent, or Firm*—Stevens, Davis, Miller & Mosher, LLP

(57) ABSTRACT

In a receiving side apparatus 150, reception quality of receive data is measured by a reception quality measurement section 157, receive data errors are detected by an error detection section 156, and when an error is detected a retransmission request signal and reception quality signal are transmitted multiplexed with transmit data by a transmit frame creation section 158. In a transmitting side apparatus 100, when a retransmission request signal is received a capacity necessary for demodulating data in a receiving side apparatus 150 is detected from a reception quality signal by a scheduling section 110, and data is retransmitted at that capacity. By this means it is possible to reduce the number of data retransmissions during transmission and reception, and to improve transmission efficiency.

10 Claims, 4 Drawing Sheets

U.S. PATENT DOCUMENTS 6,367,045 B1 * 4/2002 Khan et al. .................. 714/748

FOREIGN PATENT DOCUMENTS

| GB | 2287383 | 9/1995 |
| JP | 55117353 | 9/1980 |
| JP | 58081356 | 5/1983 |
| JP | 01119136 | 5/1989 |
| JP | 01141431 | 6/1989 |
| JP | 07123079 | 5/1995 |
| JP | 07336368 | 12/1995 |
| JP | 09298526 | 11/1997 |
| JP | 10247900 | 9/1998 |
| JP | 11510982 | 9/1999 |
| WO | 9701900 | 1/1997 |

OTHER PUBLICATIONS

J.R. McChesney et al.; "Optimization of an Adaptive Link Control Protocol for Multimedia Packet Radio Networks," Military Communications Conference Proceedings, 1999, Milcom 1999, IEEE Atlantic City, NJ, USA, IEEE, US, Oct. 31-Nov. 3, 1999, Piscataway, NJ, USA, IEEE, US, pp. 261-265, XP010369667, ISBN: 0-7803-5538-5.

R. El-Marakby, et al.; "Towards Managed Real-time Communications in the Internet Environment," PROC. of the fourth IEEE Workshop on the Architecture and Implementation of high performance communication systems (HPCS '97), Jun. 23, 1997, XP010509178, pp. 1-9.

International Search Report dated Aug. 14, 2001.

Mingjie Xu, et al., "A Hybrid ARQ Scheme Using Multiple Punctured Convolutional Codes with Different Punctured Patterns", [IT97-31], Denshi Joho Tsuushin Gakkai Gijutsu Kenkyuu Houkoku [Joho Riron] Denshi Joho Tsuushin Gakkai, Technical Report of IEICE, Jul. 25, 1997, vol. 97, No. 208, pp. 43-47.

T. Niinomi, et al., "Selective Repeat Type-II Hybrid ARQ/FEC Scheme Using Rate-Compatible Punctured Convolutional Code", In: Communications (1990), ICC'90, Including Supercomm Technical Sessions, SUPERCOMM/ICC '90, Conference Record, IEEE International Conference on, (1990), Vol. 3, pp. 1251-1255.

* cited by examiner

SYSTEM AND METHOD FOR REGULATING DATA TRANSMISSION IN ACCORDANCE WITH A RECEIVER'S EXPECTED DEMODULATION CAPACITY

TECHNICAL FIELD

The present invention relates to a data transmission system composed of a communication terminal apparatus and base station apparatus in a mobile communication system and a method of data transmission between these apparatuses.

BACKGROUND ART

Heretofore, a data transmission system and data transmission method of this kind have been disclosed in Patent Publication No. 1647396.

FIG. 1 is a block diagram showing the configuration of a conventional data transmission system. The data transmission system shown in FIG. 1 comprises a transmitting side apparatus 10 and a receiving side apparatus 60.

The transmitting side apparatus 10 comprises a buffer 11, transmit frame creation section 12, modulator 13, transmit radio section 14, antenna 15, antenna duplexer 16, receive radio section 17, demodulator 18, and separator 19.

The receiving side apparatus 60 comprises an antenna 61, antenna duplexer 62, receive radio section 63, demodulator 64, data holding section 65, error detection section 66, transmit frame creation section 67, modulator 68, and transmit radio section 69.

With this kind of configuration, first, in the transmitting side apparatus 10, transmit data is stored in the buffer 11, this stored transmit data is framed by the transmit frame creation section 12, and this transmit frame signal is output to the modulator 13.

After undergoing modulation processing by the modulator 13, the transmit frame signal undergoes predetermined radio processing such as up-conversion by the transmit radio section 14, and after passing via the antenna duplexer 16, is transmitted as a radio signal from the antenna 15.

Then, in the receiving side apparatus 60, a signal received by the antenna 61 is output via the antenna duplexer 62 to the receive radio section 63, where it undergoes predetermined radio processing such as down-conversion, and the resulting signal is output to the demodulator 64.

The received signal is demodulated by the demodulator 64, and this demodulated receive data is held in the data holding section 65 and output to the error detection section 66. The error detection section 66 performs error detection on the receive data. If an error is detected, a signal (hereinafter referred to as "NACK signal") requesting retransmission is output from the error detection section 66 to the transmit frame creation section 67.

In the transmit frame creation section 67, framing is performed that multiplexes the NACK signal with transmit data, and this transmit frame signal is output to the modulator 68. This transmit frame signal is modulated by the modulator 68, and after undergoing predetermined radio processing by the transmit radio section 69, is transmitted as a radio signal from the antenna 61 via the antenna duplexer 62.

This transmit signal is received by the antenna 15 of the transmitting side apparatus 10, output via the antenna duplexer 16 to the receive radio section 17 where it undergoes predetermined radio processing, and then demodulated by the demodulator 18 and separated into receive data and a NACK signal by the separator 19. The receive data is output to latter-stage receive processing circuitry (not shown), and the NACK signal is output to the buffer 11, whereby the data previously transmitted from the buffer 11 is retransmitted.

This retransmitted data is received in the receiving side apparatus 60 in the same way as described above, and is held combined with the previous receive data in the data holding section 65. This held combined data undergoes error detection by the error detection section 66.

As described above, if an error is detected, a NACK signal is output to the transmit frame creation section 67. If, on the other hand, no error is detected, a transmission request signal (hereinafter referred to as "ACK signal") requesting transmission of the next data from the transmitting side apparatus 10 is output to the transmit frame creation section 67.

The above-described series of operations is repeated until an ACK signal is obtained in this way. When an ACK signal is obtained, the data in the data holding section 65 is considered to be receive data, and is output to latter-stage receive processing circuitry (not shown). Following this output, that receive data is eliminated from the data holding section 65.

When an ACK signal is input to the transmit frame creation section 67, the transmit frame creation section 67 performs framing that multiplexes the ACK signal with transmit data. This transmit frame signal is transmitted to the transmitting side apparatus 10 as described above.

In the transmitting side apparatus 10, the received ACK signal is output to the buffer 11, and the data for which that ACK signal was obtained is eliminated from the buffer 11. Then, transmission of the next data begins.

As described above, in a conventional data transmission system, receive data error detection is carried out by the receiving side apparatus, and if an error is detected a retransmission request is made to the transmitting side apparatus. In response to this, an operation to retransmit the same data is repeated, so that eventually there is no data error in the receiving side apparatus.

However, with conventional apparatuses, in response to a retransmission request from the receiving side, an operation that performs retransmission on the transmitting side is simply repeated until there is no data error on the receiving side, and there is thus a problem in that, if the retransmitted data is not appropriate, the number of retransmissions will be large and transmission efficiency will degrade.

DISCLOSURE OF THE INVENTION

It is an object of the present invention to provide a data transmission system and data transmission method that enable the number of data retransmissions during transmission and reception to be decreased, thereby enabling transmission efficiency to be improved.

This object is achieved by noting that receive data can be combined, and as long as the result of combination meets a predetermined quality, receive data can be demodulated; and detecting the capacity necessary for demodulation, and performing scheduling at the time of retransmission so that data is retransmitted at the capacity necessary for demodulation.

BEST MODE FOR CARRYING OUT THE INVENTION

With reference now to the accompanying drawings, embodiments of the present invention will be explained in detail below.

(Embodiment 1)

Figure 1:
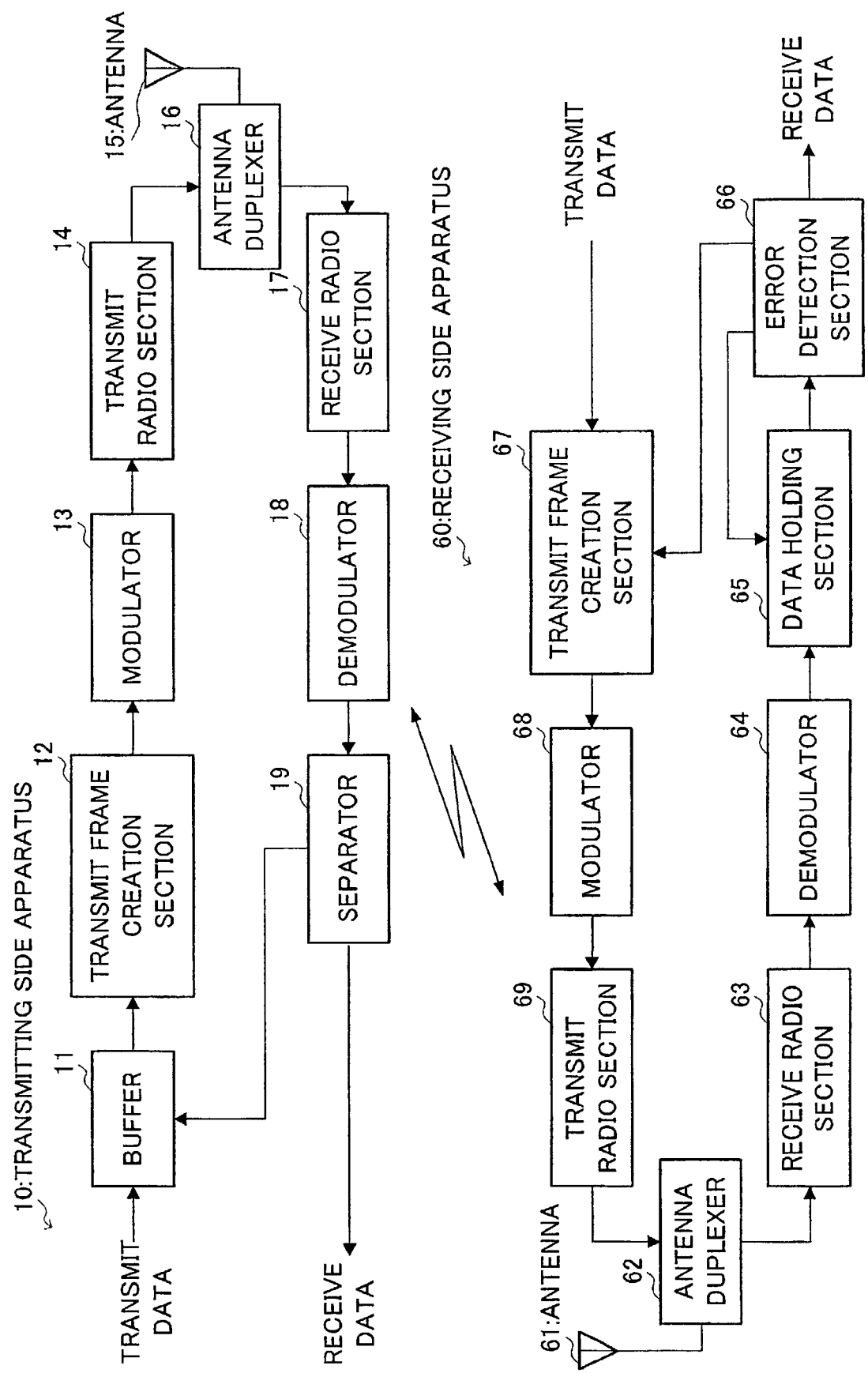
FIG. 1 is a block diagram showing the configuration of a conventional data transmission system.
Figure 2:
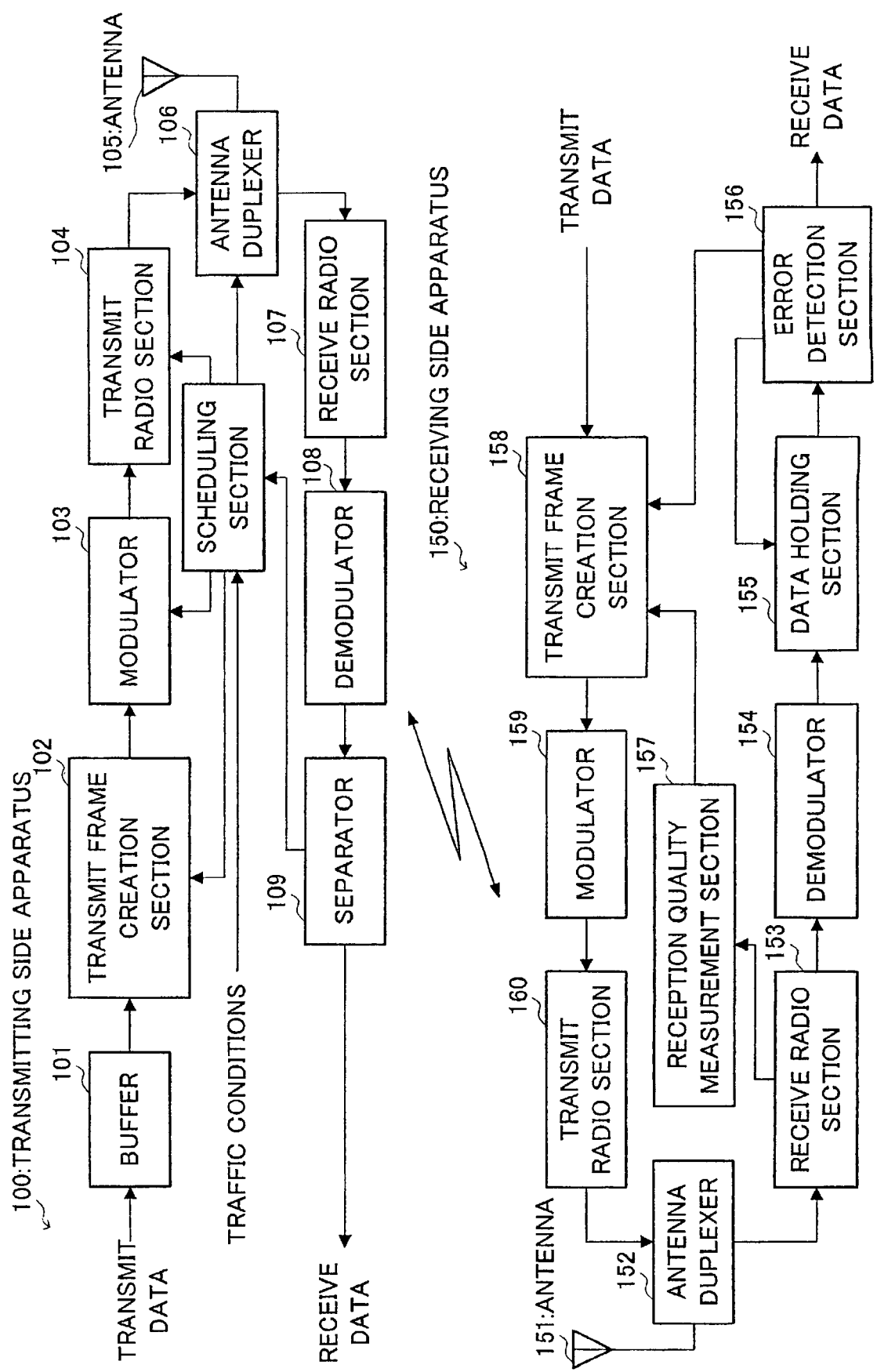
FIG. 2 is a block diagram showing the configuration of a data transmission system according to Embodiment 1 of the present invention.

FIG. 2 is a block diagram showing the configuration of a data transmission system according to Embodiment 1 of the present invention. The data transmission system shown in FIG. 2 comprises a transmitting side apparatus 100 and a receiving side apparatus 150.

The transmitting side apparatus 100 comprises a buffer 101, transmit frame creation section 102, modulator 103, transmit radio section 104, antenna 105, antenna duplexer 106, receive radio section 107, demodulator 108, separator 109, and scheduling section 110.

The receiving side apparatus 150 comprises an antenna 151, antenna duplexer 152, receive radio section 153, demodulator 154, data holding section 155, error detection section 156, reception quality measurement section 157, transmit frame creation section 158, modulator 159, and transmit radio section 160.

The flow of data transmitted and received between the transmitting side apparatus 100 and receiving side apparatus 150 will be described below.

First, in the transmitting side apparatus 100, transmit data is stored in the buffer 101, this stored transmit data is framed by the transmit frame creation section 102, and this transmit frame signal is output to the modulator 103.

After undergoing modulation processing by the modulator 103, the transmit frame signal undergoes predetermined radio processing such as up-conversion by the transmit radio section 104, and after passing via the antenna duplexer 106, is transmitted as a radio signal from the antenna 105.

Then, in the receiving side apparatus 150, a signal received by the antenna 151 is output via the antenna duplexer 152 to the receive radio section 153. In the receive radio section 153 predetermined radio processing such as down-conversion is carried out on the radio frequency received signal, and a baseband received signal is output to the reception quality measurement section 157 and demodulator 154.

In the reception quality measurement section 157, the received signal quality is determined by measurement of the SIR (signal to interference ratio), received field strength, or the like, and a signal indicating this received signal quality (hereinafter referred to as "reception quality signal") is output to the transmit frame creation section 158.

The received signal is demodulated by the demodulator 154, and this demodulated receive data is held in the data holding section 155 and output to the error detection section 156. The error detection section 156 performs error detection on the receive data. If an error is detected, a NACK signal is output from the error detection section 156 to the transmit frame creation section 158.

In the transmit frame creation section 158, framing is performed that multiplexes the reception quality signal and NACK signal with transmit data, and the framed signal, which is a transmit frame signal, is output to the modulator 159.

The transmit frame signal is modulated by the modulator 159, and after undergoing predetermined radio processing by the transmit radio section 160, is transmitted as a radio signal from the antenna 151 via the antenna duplexer 152.

This transmit signal is received by the antenna 105 of the transmitting side apparatus 100, output via the antenna duplexer 106 to the receive radio section 107 where it undergoes predetermined radio processing, and then demodulated by the demodulator 108 and output to the separator 109.

In the separator 109, the demodulated data is separated into three components: receive data, a NACK signal, and a reception quality signal. The receive data is output to latter-stage receive processing circuitry (not shown), and the NACK signal and reception quality signal are output to the scheduling section 110.

In the scheduling section 110, a retransmission request is recognized from the NACK signal, radio resources are assigned according to the traffic conditions at the time of retransmission, scheduling is determined according to these radio resources and the reception quality signal, and retransmission is carried out using this scheduling.

Here, the scheduling section 110 finds the maximum transmission capacity of data that can be transmitted from the traffic volume at the time of retransmission, and if the capacity necessary for demodulation is greater than this maximum transmission capacity, performs scheduling so that data is retransmitted at the maximum transmission capacity.

Assume, for example, that 30% of the capacity necessary for demodulation is received in the first transmission, and the reception quality signal is information indicating that a further 70% capacity is necessary for demodulation. In this case, if there is room in the traffic, the scheduling section 110 performs scheduling so that data is transmitted at 70% capacity at one time.

However, if there is no room in the traffic, and, for example, data can only be transmitted at 30% capacity, the scheduling section 110 will retransmit data at 30% capacity. In this case, since only 60% of the capacity necessary for demodulation has been received at that point, a NACK signal is again returned to have 40% retransmitted. If, at this time, data can only be transmitted at 30%, retransmission is performed again at 30% capacity. In this way, 90% of the necessary capacity is received by the receiving side, and therefore 10% capacity retransmission is requested by the next NACK signal. So 10% retransmission is performed this time. Thus, in response to a request that exceeds the maximum capacity, scheduling is performed so that data is retransmitted at the maximum capacity at that point. In this case, the number of data retransmissions is three.

Also, scheduling need not be limited to being determined according to the number of retransmissions in this way, but may also be determined taking account of a transmission method other than number of retransmissions. An example of another transmission method is to transmit data according to any one or a combination of spreading factor, transmission rate, modulation method, coding rate, beam width, and array directivity. That is to say, as well as the number of retransmissions being determined according to the current traffic, the other transmission method is changed, and scheduling is determined according to the transmission method after this change.

A change of spreading factor is carried out for the transmit frame creation section 102 and modulator 103, a change of transmission rate for the transmit frame creation section 102, a change of modulation method for the transmit frame creation section 102 and modulator 103, and a change of code rate for the transmit frame creation section 102. Changes of beam width and array directivity are carried out when the antenna 105 has an array configuration.

Based on scheduling determined in this way, data transmitted last time in the buffer 101 is retransmitted at the capacity necessary for demodulation.

This retransmitted data is received by the receiving side apparatus 150 in the same way as described above, and is combined with the previous receive data and held in the data holding section 155. This held combined data undergoes error detection by the error detection section 156.

As described above, if an error is detected, a NACK signal is output to the transmit frame creation section 158. If, on the other hand, no error is detected, an ACK signal requesting transmission of the next data from the transmitting side apparatus 100 is output to the transmit frame creation section 158.

The above-described series of operations is repeated until an ACK signal is obtained in this way. When an ACK signal is obtained, the data in the data holding section 155 is considered to be receive data, and is output to latter-stage receive processing circuitry (not shown). Following this output, that receive data is eliminated from the data holding section 155.

When an ACK signal is input to the transmit frame creation section 158, the transmit frame creation section 158 performs framing that multiplexes the ACK signal with transmit data. This transmit frame signal is transmitted to the transmitting side apparatus 100 as described above.

In the transmitting side apparatus 100, the received ACK signal is sent to the scheduling section 110. When the ACK signal is input to the scheduling section 110, the scheduling section 110 performs control to eliminate data for which that ACK signal was obtained from the buffer 101, and starts transmission control for the next data. At the same time, radio resources to be used for transmission are assigned according to the traffic conditions at that start time, scheduling is determined according to the radio resources, and transmission of the next data is started in accordance with this scheduling.

Thus, the receiving side apparatus performs receive data error detection, and when an error is detected transmits a retransmission request signal and reception quality signal, and the transmitting side apparatus identifies the capacity necessary for demodulation by the receiving side apparatus from the reception quality signal when the retransmission request signal is received, and retransmits data at this capacity necessary for demodulation.

By this means, it is possible to reduce the number of data retransmissions during transmission and reception, and improve transmission efficiency. In other words, it is possible to prevent the degradation in transmission efficiency due to the large number of retransmissions resulting from simply repeating retransmissions until there is no data error on the receiving side in the conventional way.

Also, when data is retransmitted, the transmitting side apparatus finds the maximum transmission capacity at which transmission is possible from the traffic volume at that time, and if the capacity necessary for demodulation is greater than this maximum transmission capacity, retransmits data at the maximum transmission capacity.

By this means, data can be retransmitted efficiently even if the capacity necessary for demodulation is greater than the transmissible maximum transmission capacity at the time of retransmission, and transmission efficiency can be improved.

Moreover, when data is retransmitted, in the transmitting side apparatus the scheduling section 110 assigns radio resources comprising various radio communication functions according to traffic conditions at that time so that data can be retransmitted at the greatest possible capacity.

By this means, a transmission method that includes number of transmissions can be changed optimally within radio resources, thereby enabling the number of data retransmissions during transmission and reception to be reduced, and transmission efficiency to be improved.

Furthermore, in the transmitting side apparatus 100, the scheduling section 110 may preassign radio resources to be used for transmission according to traffic conditions before transmitting the first data, and transmit according to these radio resources. In this case, when the receiving side apparatus 150 sends back a NACK signal and reception quality signal, the scheduling section 110 determines scheduling according to the aforementioned preassigned radio resources, and applies this scheduling until the end of retransmissions.

Also, assignment of radio resources used in transmission according to traffic conditions may be performed once for every particular chunk of data—that is, every certain number of transmissions of packet data. Moreover, it is also possible to perform radio resource assignment only at the time of initial data transmission when transmission of all packet data is performed.

By these means, it is possible to eliminate processing for deciding on radio resources when retransmitting, and to reduce overall apparatus processing. Furthermore, since individual channels can be extended, scheduling can be carried out in an unrestricted fashion without considering other users.

Also, it is possible to perform reception quality measurement only the first time an error is detected. In this case, the first reception quality signal sent to the scheduling section 110 is stored, and thereafter, that stored reception quality signal is used as it is until the end of retransmissions. In addition, reception quality measurement may be performed at a rate of once per predetermined number of times. In this case, a reception quality signal sent to the scheduling section 110 is stored, and thereafter, that stored reception quality signal is sequentially updated for use.

By this means, reception quality measurement by the receiving side apparatus can be reduced, enabling lower receiving side apparatus power consumption to be achieved. This is especially useful when the receiving side apparatus is a communication terminal apparatus.

Furthermore, when determining scheduling at the time of data transmission, a configuration may be used whereby reception quality for the previous data is referenced. That is to say, in the transmitting side apparatus 100 the scheduling section 110 stores the reception quality signal for the previous data. When an ACK signal is sent and transmission of the previous data ends, transmission of the next data is started. At this time the scheduling section 110 assigns radio resources to be used for transmission according to the stored reception quality signal and the traffic conditions.

For example, if reception quality is good and retransmission is not necessary, transmission is performed with radio resources reduced to a level at which demodulation can be performed at one time. To be more specific, assuming that in initial data transmission the receiving side apparatus 150 receives at 120% of the capacity necessary for demodulation, in transmission of the next data, transmission will be performed at 10/12 of the capacity of the previous time so that data is received at 100% of the capacity necessary for demodulation.

On the other hand, if reception quality is poor, transmission is performed with radio resources extended to a level at which demodulation can be performed at one time. For example, assuming that in initial data transmission data is received at 30% of the capacity necessary for demodulation, and the remaining 70% capacity transmission is performed by retransmission, enabling demodulation to be achieved, in transmission of the next data, transmission will be performed at 10/3 of the capacity of the previous time so that data is received at 100% of the capacity necessary for demodulation. However, this applies only to the case where 100% transmission is permitted within the radio resources. If, for example, transmission within the radio resources is only permitted at up to 80% of the capacity necessary for demodulation, it will be determined that the next data is to be sent at 80%, followed by retransmission at 20%.

By using the previous reception quality signal in initial data transmission in this way, it is possible to transmit data with an optimal transmission method including number of retransmissions even in initial transmission.

In the above description, the transmit frame creation section 158 performs framing by independently multiplexing the reception quality signal and the NACK signal/ACK signal with transmit data. However, the present invention is not limited to this, and it is also possible for the transmit frame creation section 158 to perform processing so that the NACK signal has information indicating reception quality, and to perform framing by multiplexing the post-processing NACK signal/ACK signal with transmit data.

For example, there may be three kinds of NACK signal representation—"N1", "N2", and "N3"—according to the reception quality, with representation as four states (two bits) together with the ACK signal "AC". Then the three kinds of NACK signal will be differentiated as follows: "N1" when reception quality is comparatively good and demodulation will be possible on reception of a signal of a little more capacity (for example, 0 to 25%); "N2" when reception quality is good, and a signal of a certain level of capacity (for example, 25 to 50%) is necessary for demodulation; and "N3" when reception quality is poor and a signal of considerable capacity (for example, 50% or more) is necessary for demodulation.

Figure 3:
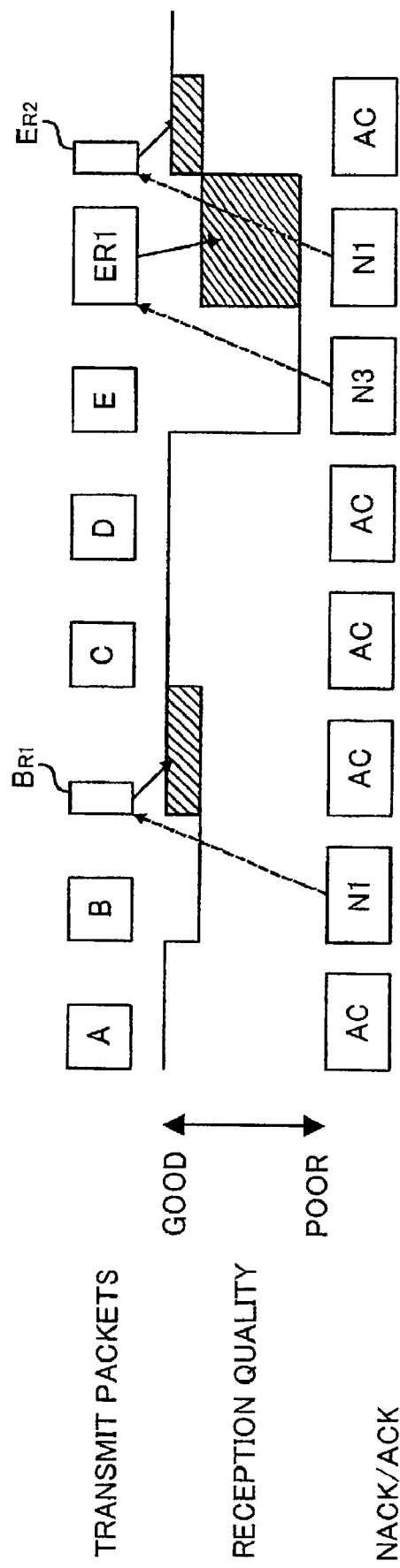
FIG. 3 is a drawing showing a reception quality transmission method for a data transmission system according to Embodiment 1 of the present invention.

FIG. 3 is a drawing showing the reception quality transmission method in this case. FIG. 3 shows transmit packets A to E, reception quality at the time of transmission of those packets, and a NACK signal/ACK signal represented by four states based on reception results. The width of a transmit packet indicated by a rectangle shows the size of the capacity.

FIG. 3 shows the case where an error is detected in packets B and E and the other packets are received correctly. The propagation environment when packet B is transmitted is comparatively good, and the propagation environment when packet E is transmitted is poor.

In the case shown in FIG. 3, the receiving side apparatus transmits "N1" to the transmitting side apparatus to request retransmission of packet B. The transmitting side apparatus determines that a further 25% capacity is necessary for demodulation, and retransmits packet B ($B_{R1}$).

The receiving side apparatus also transmits "N3" to the transmitting side apparatus to request retransmission of packet E. The transmitting side apparatus determines that a further 75% capacity is necessary for demodulation, and retransmits packet E ($E_{R1}$).

It is herein assumed that the receiving side apparatus receives packet $E_{R1}$ but is not able to demodulate the packet because the capacity is not quite sufficient. The receiving side apparatus then transmits "N1" to request retransmission of packet E once again. The transmitting side apparatus determines that a further 25% capacity is necessary for demodulation, and retransmits packet E ($E_{R2}$).

If framing is performed by multiplexing with transmit data a NACK signal or ACK signal that has information indicating reception quality in this way, it is possible to reduce the transmission of signals other than transmit data compared with the case where a reception quality signal and NACK signal/ACK signal are simply multiplexed with transmit data, and thus to improve transmission efficiency.

Also, if the number of kinds of NACK signal is a power of 2−1, the number of kinds of signal together with the ACK signal is a power of 2, and therefore this is convenient for performing binary digital transmission.

(Embodiment 2)

Figure 4:
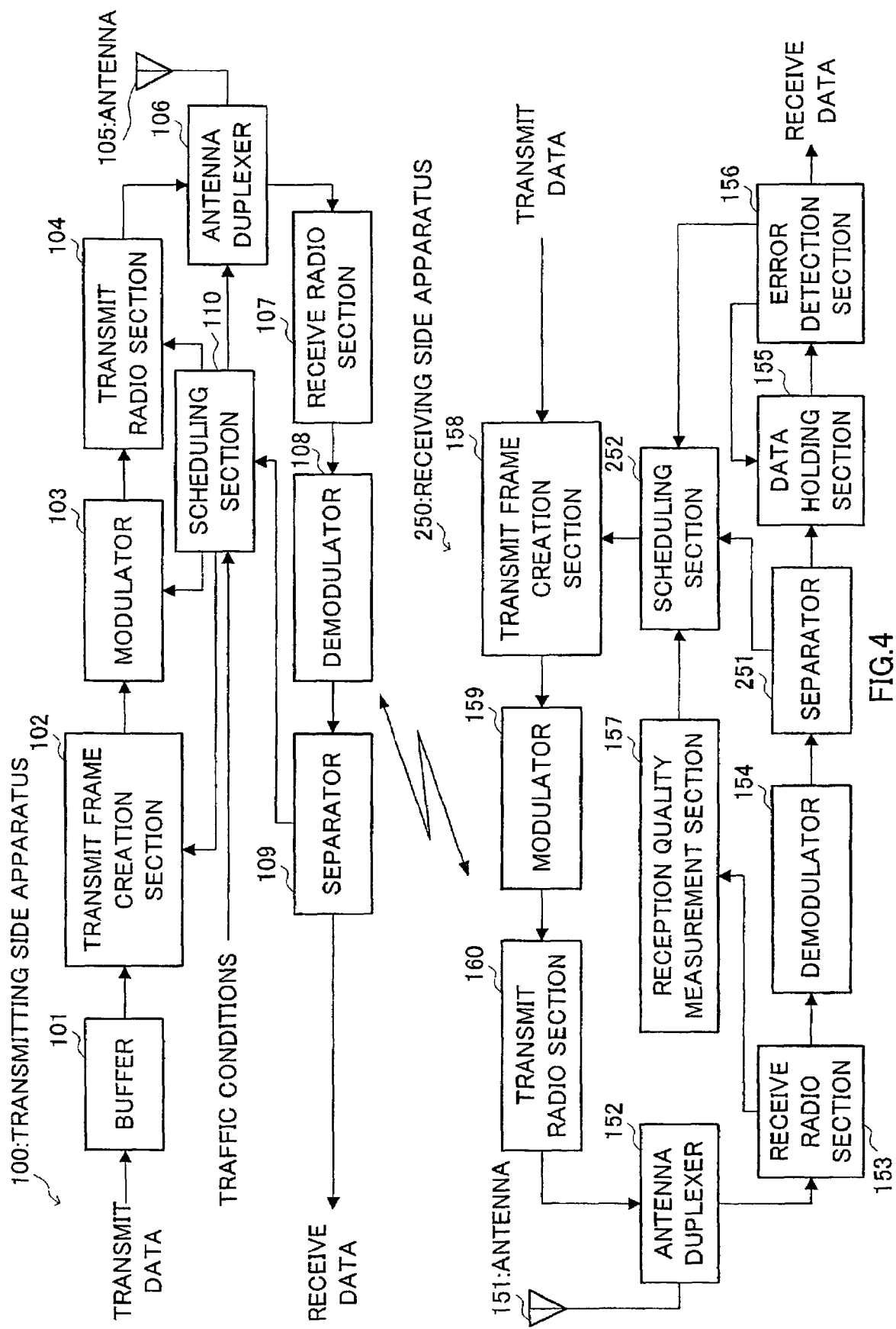
FIG. 4 is a block diagram showing the configuration of a data transmission system according to Embodiment 2 of the present invention.

FIG. 4 is a block diagram showing the configuration of a data transmission system according to Embodiment 2 of the present invention. Parts in the data transmission system shown in FIG. 4 identical to those in FIG. 2 are assigned the same codes as in FIG. 2 and their detailed explanations are omitted.

The data transmission system shown in FIG. 4 differs from that in FIG. 2 in having a separator 251 and scheduling section 252 added to the receiving side apparatus 250.

With this kind of configuration, first, in the transmitting side apparatus 100 the scheduling section 110 assigns radio resources to be used for transmission according to the traffic conditions before transmit data is transmitted, and outputs a radio resource signal indicating information on these radio resources to the transmit frame creation section 102.

In the transmit frame creation section 102, framing is performed that multiplexes the radio resource signal with transmit data, and this transmit frame signal is transmitted.

This transmit frame signal is received by the receiving side apparatus 250, and after being demodulated by the demodulator 154, is separated into data and a radio resource signal by the separator 251. This separated data is held by the data holding section 155 and output to the error detection section 156, and the radio resource signal is output to the scheduling section 252.

In the scheduling section 252, when a NACK signal is input in the event of error detection, scheduling within assigned radio resources is determined based on the reception quality signal and radio resource signal, and a scheduling signal indicating the scheduling result and a NACK signal are output to the transmit frame creation section 158.

In the transmit frame creation section 158, framing is performed that multiplexes the scheduling signal and NACK signal with transmit data, and this transmit frame signal is transmitted.

This transmit frame signal is received by the transmitting side apparatus 100, and is separated into three components by the separator 109: data, a NACK signal, and a scheduling signal.

The NACK signal and scheduling signal are output to the scheduling section 110, where retransmission control is performed according to the scheduling indicated by the scheduling signal.

Data retransmitted in accordance with this control is combined with the previous data and held in the data holding section 155, and this combined data undergoes error detection by the error detection section 156. Thereafter, the above-described series of operations is repeated until an ACK signal is obtained.

When an ACK signal is obtained, the data in the data holding section 155 is considered to be receive data, and is output to latter-stage receive processing circuitry (not shown). Following this output, that receive data is eliminated from the data holding section 155.

The ACK signal is input to the transmit frame creation section 158 where framing is performed that multiplexes the ACK signal with transmit data, and the resulting signal is transmitted to the transmitting side apparatus 100.

In the transmitting side apparatus 100, the received ACK signal is sent to the scheduling section 110 where control is performed to eliminate data for which the ACK signal was obtained from the buffer 101, and transmission control for the next data is started.

At the same time, in the scheduling section 110 radio resources to be used for transmission are assigned according to the traffic conditions at that start time, a radio resource signal indicating information on those radio resources is multiplexed with the next output to form a frame by the transmit frame creation section 102, and this transmit frame signal is transmitted.

Thus the transmitting side apparatus 100 preassigns radio resources to be used for transmission based on the traffic conditions before data transmission, and transmits information on these radio resources. The receiving side apparatus 250 finds the capacity necessary for demodulation from the reception quality when a receive data error is detected, and determines scheduling information for retransmitting data within the radio resources indicated by the above-mentioned information. The transmitting side apparatus 100 then retransmits data based on that scheduling information.

By this means, it is sufficient for data necessary for demodulation found on the receiving side to be retransmitted from the transmitting side, enabling the number of data retransmissions during transmission and reception to be reduced and transmission efficiency to be improved.

As is clear from the above descriptions, according to the present invention the number of data retransmissions during transmission and reception can be reduced and transmission efficiency can be improved by detecting the capacity necessary for demodulation, and, at the time of retransmission, performing scheduling and retransmitting data at the capacity necessary for demodulation.

This application is based on Japanese Patent Application No. 2000-150507 filed on May 22, 2000, and Japanese Patent Application No. 2001-078466 filed on Mar. 19, 2001, entire content of which is expressly incorporated by reference herein.

INDUSTRIAL APPLICABILITY

The present invention is suit-able for use in a communication terminal apparatus and base station apparatus in a mobile communication system.

The invention claimed is:

1. A data transmission system comprising a transmitting side apparatus that transmits data and a receiving side apparatus that receives data, wherein:
   said receiving side apparatus measures the reception quality of received data and transmits, if an error is detected in the received data, to said transmitting side apparatus a retransmission request signal corresponding to the measured reception quality, wherein the correspondence is such that a plurality of retransmission request signals transmitted in response to detected errors are differentiated according to respective measures of reception quality; and
   said transmitting side apparatus detects, upon receiving the retransmission request signal, a capacity necessary for demodulation at said receiving side apparatus, based on the reception quality corresponding to the received retransmission request signal, and determines a capacity for data retransmission based on the detected demodulation capacity and traffic conditions,
   wherein the total number of reception quality measures that may differentiate the plurality of retransmission request signals is a number one less than a power of two.

2. The data transmission system according to claim 1, wherein said transmitting side apparatus finds a transmissible maximum transmission capacity in traffic, at a time of data retransmission, and if the detected capacity necessary for demodulation is greater than this maximum transmission capacity, retransmits data at said maximum transmission capacity.

3. The data transmission system according to claim 1, wherein said transmitting side apparatus assigns radio resources so that data is retransmitted at a transmissible maximum transmission capacity in traffic at a time of data retransmission.

4. The data transmission system according to claim 1, wherein said transmitting side apparatus preassigns radio resources to be used for transmission before data transmission and uses these assigned radio resources until retransmission of one transmit unit of data ends.

5. The data transmission system according to claim 1, wherein said transmitting side apparatus preassigns radio resources to be used for transmission before data transmission and uses these assigned radio resources for a selected number of data units or for the transmission and all retransmissions of a data unit.

6. The data transmission system according to claim 1, wherein all retransmissions of particular data received in error are transmitted at a capacity based on the measured reception quality of the original transmission of said particular data.

7. The data transmission system according to claim 1, wherein a predetermined number of retransmissions of particular data received in error are transmitted at a capacity based on the measured reception quality of the original transmission of said particular data.

8. The data transmission system according to claim 1, wherein said transmitting side apparatus assigns radio resources according to traffic at the time of data retransmission and transmits, within said radio resources, data at a capacity that compensates for an excess or deficiency of measured reception quality at the time of a previous data transmission.

9. A data transmission system comprising a base station apparatus and a communication terminal apparatus, wherein:

said communication terminal apparatus measures the reception quality of received data and transmits, if an error is detected in the received data, to said base station apparatus a retransmission request signal corresponding to the measured reception quality, wherein the correspondence is such that a plurality of retransmission request signals transmitted in response to detected errors are differentiated according to respective measures of reception quality;

said base station apparatus detects, upon receiving the retransmission request signal, a capacity necessary for demodulation at said communication terminal apparatus, based on the reception quality corresponding to the received retransmission request signal, and determines a capacity for data retransmission based on the detected demodulation capacity and traffic conditions; and the total number of reception quality measures that may differentiate the plurality of retransmission request signals is a number one less than a power of two.

10. A data transmission method comprising:

at a receiving side apparatus:

measuring the reception quality of received data, detecting whether the received data has an error; and transmitting, if an error is detected in the received data, to a transmitting side apparatus a retransmission request signal corresponding to the measured reception quality, wherein the correspondence is such that a plurality of retransmission request signals transmitted in response to detected errors are differentiated according to respective measures of reception quality, and at the transmitting side apparatus:

receiving the retransmission request signal transmitted by the receiving side apparatus;

detecting a capacity necessary for demodulation at a receiving side apparatus, based on the reception quality corresponding to the received retransmission request signal; and determining a capacity for data retransmission based on the detected demodulation capacity and traffic conditions, wherein the total number of reception quality measures that may differentiate the plurality of retransmission request signals is a number one less than a power of two.

* * * * *